United States Patent [19]
Stull

[11] Patent Number: 5,827,023
[45] Date of Patent: Oct. 27, 1998

[54] TRUCKBED TIE DOWN SYSTEM

[76] Inventor: William S. Stull, 1399 Hidden Springs Dr., Corona, Calif. 91721

[21] Appl. No.: 550,209

[22] Filed: Oct. 30, 1995

[51] Int. Cl.[6] ..................................................... B60P 7/08
[52] U.S. Cl. ........................ 410/110; 410/102; 410/106; 296/3; 296/41
[58] Field of Search .................................... 410/101, 102, 410/106, 108, 110, 115, 116; 296/32, 36, 41, 3; 248/499, 503; 224/405, 321, 322; 280/756, 770

[56] References Cited

U.S. PATENT DOCUMENTS

| | | | |
|---|---|---|---|
| 4,253,785 | 3/1981 | Bronstein | 410/110 |
| 4,396,324 | 8/1983 | Ellis | 410/101 |
| 4,604,013 | 8/1986 | Elwell et al. | 410/106 |
| 4,650,382 | 3/1987 | Johnson | 410/110 |
| 4,760,986 | 8/1988 | Harrison | 410/110 X |
| 4,818,162 | 4/1989 | Zukowski et al. | 410/116 |
| 4,850,770 | 7/1989 | Millar, Jr. | 410/110 |
| 4,909,559 | 3/1990 | Zettle | 296/41 |
| 4,936,724 | 6/1990 | Dutton | 410/110 |
| 4,954,031 | 9/1990 | Geeck, III | 410/110 |
| 5,139,375 | 8/1992 | Franchuk | 410/105 |
| 5,228,736 | 7/1993 | Dutton | 410/104 X |
| 5,253,918 | 10/1993 | Wood et al. | 410/106 X |
| 5,263,761 | 11/1993 | Hathaway et al. | |
| 5,454,612 | 10/1995 | Christensen | 296/36 X |
| 5,584,521 | 12/1996 | Hathaway et al. | 296/36 |

*Primary Examiner*—Stephen T. Gordon
*Attorney, Agent, or Firm*—Knobbe, Martens, Olson, & Bear, LLP

[57] ABSTRACT

A rail mounting member that is to be positioned on the sidewall of a pickup truck or other vehicle having a cargo bed with a sidewall. The mounting rail has a hook member which hooks around the bottom flange of the sidewall and an upper surface which is adhesively attached to the upper surface of the sidewall of the truck. A securing surface is attached to the rail mounting member so as to extend inward into the bed of the vehicle and a plurality of mounting points are positioned on the securing surface. Preferably, the securing surface extends substantially the entire length of the rail mounting member so as to allow securing of cargo to the mounting member along its entire length. The rail mounting member has ribs and indentations formed on the top side which will receive a mounting plate having matching indentations formed on a bottom side. The mounting plate preferably includes a sleeve that can receive a vertical member for supporting vertically mounted structures such as light bars, overhead tool racks and the like. The mounting plate also includes a securing member that is positioned adjacent the securing surface of the rail mounting member so that a fastener can couple the mounting plate to the rail mounting member.

16 Claims, 2 Drawing Sheets

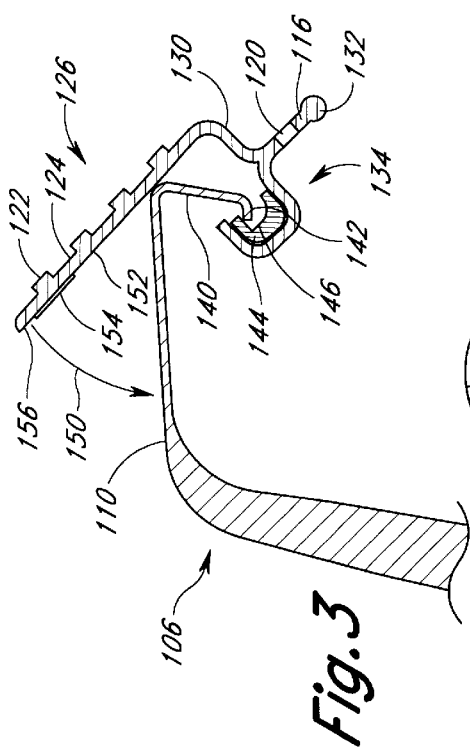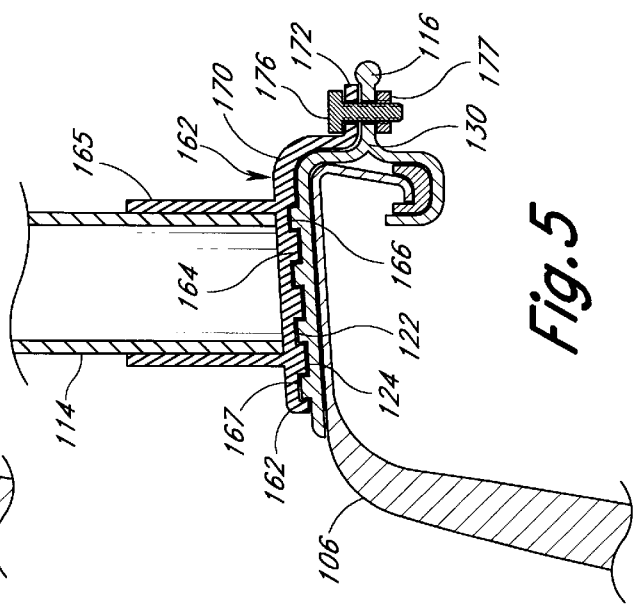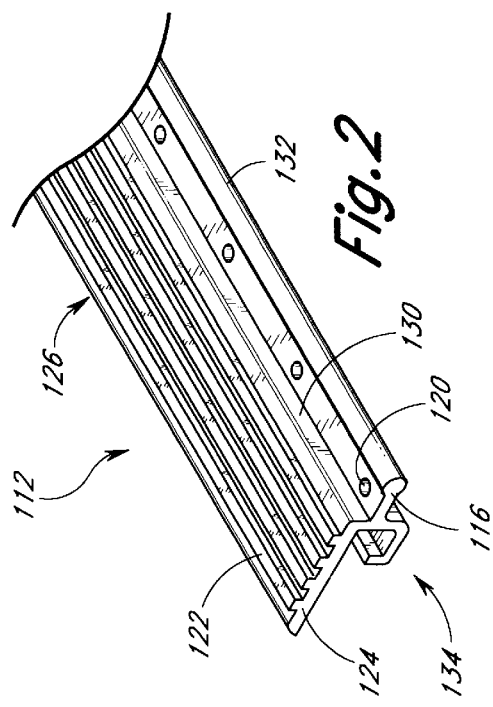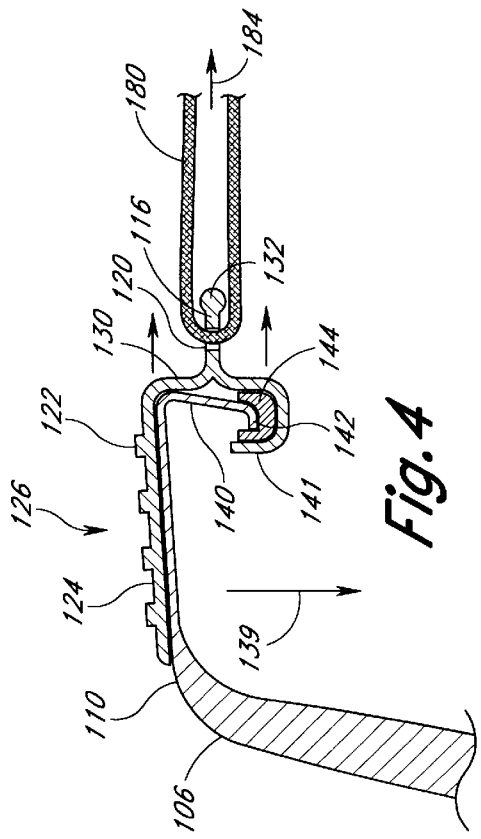

TRUCKBED TIE DOWN SYSTEM

BACKGROUND OF THE INVENTION

1. Field of the Invention

The present invention relates to accessories for vehicles and, in particular, concerns a tie down rail and rack mounting assembly for a pickup truck.

2. Description of the Related Art

Pickup trucks are a very common vehicle sold in the United States and abroad. One advantage to a pickup truck is that it can accommodate substantially more cargo than a passenger vehicle. Generally, the cargo is positioned within the bed of the pickup truck and often it is necessary to secure the cargo within the bed of the pickup truck.

To this end, most pickup trucks are equipped with several tie-down hooks to which a person can tie ropes or other securing devices to secure cargo within the bed of the pickup truck. However, with many pickup trucks that are being manufactured today, there is a limited number of tie-down hooks within the bed of the pickup truck. For example, with the standard light pickup truck there are only four tie-down hooks, two at the front end of the bed and two at the back end of the bed. Unfortunately, the limited number of tie-down hooks often makes securing cargo in the bed of a pickup truck difficult.

To address this particular problem, accessories have been manufactured for pickup trucks that provide greater flexibility for a person to secure cargo in the bed of the truck. For example, U.S. Pat. No. 4,604,013 and U.S. Pat. No. 4,650,382 both describe rail systems that are supposed to be mounted on the upper sidewalls of the pickup truck that can provide mounting points to which a person can secure a rope, bungee cord, etc. These rails extend the full length of the bed of the pickup truck and a person can secure cargo by attaching ropes and the like at different positions along the rails attached to the sidewalls of the truck.

While the assemblies disclosed in these patents provide a better surface for securing ropes and the like, these rail assemblies also require that holes be drilled into the sidewalls of the pickup trucks. In particular, both of the rail assemblies disclosed in these patents are bolted to the sidewall of the pickup truck. It can be appreciated, however, that it is often undesirable to drill holes and otherwise permanently damage the sidewall of the pickup truck.

Hence, there is a need for an assembly that will allow cargo to be readily secured in any of a number of positions within the bed of a truck. To this end, there is a need for an accessory that can be installed on the pickup truck that will provide the needed attachment and securing capability but will not require that the pickup be drilled, welded or otherwise permanently damaged.

Pickup trucks these days are also often equipped with overhead structures such as overhead racks, light bars, headache bars, bed dividers and the like that are positioned over the bed of the pickup trucks. One difficulty with many existing trucks is that these types of accessories can only be mounted on the trucks through the use of bolts and fasteners that would otherwise permanently damage the truck. Alternatively, the truck has to be pre-made with an opening that is configured to receive the overhead accessory. For example, many trucks are currently made with pre-formed openings for overhead rack assemblies. However, not all trucks are equipped with these types of openings as it is expensive to manufacture truck beds with pre-built openings and structures for overhead assemblies. Hence, it is still often necessary to drill holes and weld to place overhead assemblies in truck beds. It can be appreciated that permanent damage of the truck bed in this fashion quite often reduces the value of the truck on resale, particularly when the overhead assembly is not desired by the purchaser.

Hence, there is a further need in the prior art for an assembly that can be mounted on a vehicle such as a pickup truck and is capable of supporting an overhead assembly such as a vehicle such as a light bar, overhead rack and the like. To this end, there is a need for an assembly that will permit the mounting of such overhead assemblies that does not require pre-built structures on the pickup truck nor bolts or other fasteners that would damage the sidewalls or bed of the pickup truck.

SUMMARY OF THE INVENTION

The aforementioned needs are partially satisfied by a apparatus of the present invention which is comprised of a rail mounting member that has an attached hook member which is configured to hook around the bottom lip of the upper sidewall of a vehicle and an upper surface which is configured to rest on the upper surface of the sidewall of the vehicle when the hook member is hooked underneath the lip of the sidewall of the vehicle. Preferably, the underside of the upper surface rail mounting member has a fastener, such as an adhesive surface, which attaches to the upper surface of the sidewall of the vehicle so that the combination of the attachment between the upper surface of the rail mounting member and the sidewall and the engagement of the hook member and the lip of the sidewall securely retains the assembly in place.

Preferably, a securing surface, with a plurality of mounting points formed therein, is connected to the rail mounting member so as, in the preferred embodiment, to extend inward into the bed area of the vehicle when the assembly is securely positioned on the sidewall of the vehicle. The rail mounting member and the securing surface can preferably extend substantially the full length of the sidewall of the bed of the vehicle and the mounting points are preferably spaced along the full length of the securing surface so that a person can tie a rope or other securing device to the securing surface anywhere along the length of the bed of the vehicle.

In another aspect of one embodiment of the present invention, the topside of the rail mounting member of the assembly has ribs and indentations formed thereon. Preferably, these ribs and indentations extend longitudinally along the full length of the rail mounting member. Further, this embodiment of the present invention also includes a mounting plate that has grooves and indentations formed on the bottom surface that mate with the ribs and indentations on the rail member. Further, in one embodiment, the mounting plate has a securing member which is positioned adjacent the securing surface of the rail mounting member. The mounting plate is preferably configured so as to be able to support a vertically extending member. The vertically extending member can be used to form an overhead rack for the pickup truck or a headache bar that would extend across the back window of the pickup truck or the like. It will be appreciated that the interlocking between the grooves on the rail member and the grooves on the mounting plate securely retain the vertically extending member in a vertical orientation above the sidewall of the vehicle. Further, the flange member of the mounting plate is preferably configured so that a bolt can be extended through an opening on the flange member and through an opening that is formed in the securing surface of the rail member so as to securely retain the mounting plate in a position on top of the rail member.

Hence, the assembly of the preferred embodiments allow, not only for cargo to be secured in the bed of the vehicle substantially along the full length of the bed of the vehicle, but also permits overhead racks, headache bars and the like to be readily installed on the truck by simply positioning the mounting plate in the desired orientation with the rail member and securing the two together. It will also be appreciated that the rail securing assembly and the overhead mounting assembly can be mounted on any vehicle without requiring that bolt holes and the like be drilled in the vehicle and without requiring that openings be pre-formed in the vehicle body. Other objects and features of the present invention will become more fully apparent from the following description with reference to the accompanying drawings.

BRIEF DESCRIPTION OF THE DRAWINGS

FIG. 2 is an exploded perspective view of a preferred embodiment of a mounting rail comprising a portion of the securing rail assembly of FIG. 1;

FIG. 3 is a side cross-sectional view of the securing rail portion of FIG. 2 in a partially dismounted position;

FIG. 4 is a side cross-sectional view of the securing rail portion of the assembly of FIG. 1 in a fully mounted position on the sidewall of the bed of the pickup truck; and FIG. 5 is a cross-sectional view of the rail mounting member and the vertical mounting apparatus of the preferred embodiment shown in FIG. 1.

DETAILED DESCRIPTION OF THE PREFERRED EMBODIMENT

Figure 1:
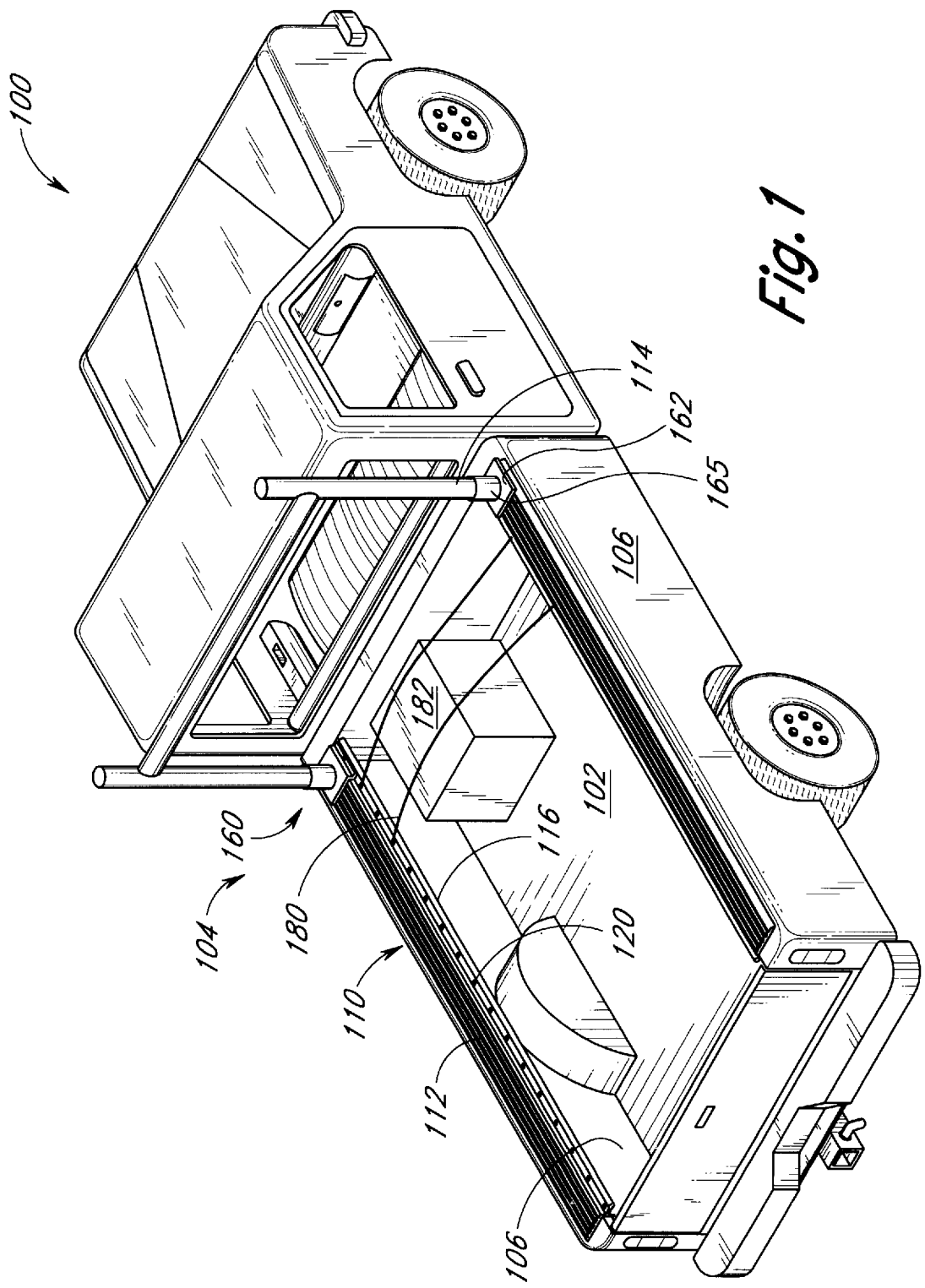
FIG. 1 is a perspective view of pickup truck having the securing rail and overhead rack assemblies of the preferred embodiment mounted thereon.

Reference will now be made to the drawings wherein like numerals refer to like parts throughout. FIG. 1 illustrates a pickup truck 100 having a bed 102 and two sidewalls 106 located on the opposite sides of the bed 102. Positioned on an upper surface 110 of both the sidewalls 106 is a securing rail and upper mounting assembly 104. The securing rail and upper mounting assembly 104 includes two components, a rail securing or mounting member 112 and a vertical member 114, which is mounted on the rail member 112 and extends vertically upward therefrom.

As shown in FIG. 1, the rail member 112 preferably can extend the full length of the upper surface 110 of the sidewall 106 of the pickup truck 100 and has a mounting or securing surface 116 that extends inward into the bed 102 of the pickup truck 100. The mounting surface 116 preferably has a plurality of mounting points 120 positioned thereon. In the embodiment shown in FIG. 1, the mounting points 120 are comprised of a plurality of holes that are spaced along the mounting surface 116 of the rail member 112, however, it will be appreciated that any of a number of different configurations of mounting points can be used including hooks, loops, etc.

Since in the embodiment shown in FIG. 1 there is a plurality of mounting points 120 spaced along the full length of the securing surface 116 and since the securing surface 116 extends substantially the full length of the bed 102 of the pickup truck 100, gear can be secured in the bed 102 of the pickup truck 100 by attaching ropes or the like to any number of the mounting points 120 that are spaced along the sidewall 106 of the pickup truck 100. This facilitates the securing of cargo within the bed 102 of the pickup truck 100 as there can be a large number of mounting points 120 formed on the securing surface 116 of the mounting rail member 112.

In the embodiment shown in FIG. 1, the rail securing or mounting member 112 extends the full length of the bed 102 of the pickup truck 100. This facilitates securing of cargo in any position within the bed of the pickup truck 100. It will be appreciated, however, that the rail mounting member 112 can be one of a number of different lengths to facilitate securing of cargo within a particular region of the bed 102 of the pickup truck 100. For example, some pickup trucks have utility boxes mounted immediately behind the cab, with these types of pickup trucks it may be desirable to only have the rail mounting member 112 mounted on the sidewall 106 behind the utility box.

FIG. 2 is a perspective view of the mounting rail member 112 which illustrates the preferred construction of the mounting rail member 112 in greater detail. Specifically, a mounting rail member 112 has a plurality of ribs 122 and indentations 124 formed on a first of upper surface 126 of the rail mounting member 112. In this embodiment, the ribs 122 and the indentations 124 extend longitudinally along the full length of the rail mounting member 112 and there are four ribs 122 which extend approximately ¼ of an inch from the upper surface 126 of the rail member 112. Hence, in the embodiment shown in FIG. 1, the ribs 122 and the indentations 124 preferably extend along the entire length of the upper surface 110 of the sidewalls 106 of the pickup truck 100.

Further, the rail mounting member 112 has a side surface 130 that extends substantially perpendicularly downward from the upper surface 126 of the rail member 112 when the rail mounting member 112 is positioned on the upper surface 110 of the sidewall 106 of the pickup truck 100 in the manner shown in FIGS. 1 and 4. The securing surface 116 preferably extends perpendicularly outward from the side 130 of the rail mounting member 112 so that the securing surface 116 extends inward into the area above the bed 102 of the pickup truck 100.

As shown in FIG. 2, the mounting points 120 in this preferred embodiment are comprised of circular holes that are formed into the securing surface 116. It will be appreciated, however, that the mounting points 120 can be comprised of any configuration of hole that would be suitable for attaching ropes, bungee cords, and the like. It will also be appreciated that the mounting points 120 should have smooth edges so that if ropes are used to secure cargo within the bed 102 of the pickup truck 100, the inner surfaces of the mounting points 120 do not cut or damage the ropes. Further, at the end of the securing surface 116, a rounded end 132 is formed and the rounded end 132 protects ropes and other securing devices from damage from a sharp surface rubbing against the rope.

At the bottom end of the side 130 of the rail mounting member 112, there is a hook-shaped extension 134 which extends outward from the side 130. In general, the hook-shaped member 134 has a U-shaped cross-section, as is shown in FIGS. 3 and 4. In the preferred embodiment, the rail mounting member 112 is comprised of a unitary piece of extruded aluminum that is formed into the configuration shown in FIG. 2.

FIGS. 3 and 4 illustrate in greater detail how the rail mounting member 112 is attached to the upper surface 110 of the sidewall 106 of the pickup truck 100. In particular, the sidewall 106 of the pickup truck 100 includes a lip 140 that extends vertically downward from the upper surface 110 of the sidewall 106. Further, in the typical sidewall 106 for a pickup truck 100, the downwardly extending lip 140 has a flange 142 that extends outwardly from the bed 102 of the pickup truck 100. The side 130 and the hook member 134 of the rail mounting member 112 are configured so that the hook member 134 hooks around the outwardly extending flange 142 at the bottom of the lip 140 of the sidewall 106.

As is shown in FIG. 3, a rubber tensioner 144 may be positioned within the hook member 134 to ensure that there is a secure fit between the flange 142 of the sidewall 106 and the U-shaped member 134. In particular, the rubber tensioner 144 has a generally U-shaped configuration with an opening 146 formed therein. Preferably, the opening 146 is configured so that the flange 142 is compression fit within the opening 146 so that horizontal and vertical movement of the mounting rail 112 relative to the flange 142 is minimized when the mounting rail 112 is securely mounted on the sidewall 106.

Once the hook member 134 is hooked around the flange 142 of the sidewall 106, the upper surface 126 of the rail mounting member 112 is rotated in the direction of the arrow 150 so that a bottom surface 152 of the rail mounting member 112 is positioned flushly against the top surface 110 of the sidewall 106 of the pickup truck 100 in the manner shown in FIG. 4. Preferably, there is a fastener, which in this embodiment is a piece of double sided tape 154, that is positioned substantially adjacent an outer edge 156 of the bottom side 152 of the upper surface 126 of the rail mounting member 112. This double sided tape 154 preferably extends the full length of the rail mounting member 112 so as to secure the upper surface 126 of the rail mounting member 112 to the upper surface 110 of the sidewall 106 of the pickup truck 100. This helps to secure the rail mounting member 112 on the upper surface 110 of the sidewall 106 in the manner shown in FIG. 4 along substantially the full length of the sidewall 106.

Further, the rubber tensioner 144 exerts a downward force, i.e., a force in the direction of arrow 139 in FIG. 4, against the bottom surface of the U-shaped hook member 134. It will be appreciated that the rubber tensioner 144 preferably exerts sufficient force so as to maintain the contact between the bottom surface 152 of the rail mounting member 112 and the top surface 110 of the sidewall 106. In the preferred embodiment, the rubber tensioner 144 is comprised of a plurality of pieces of rubber spaced along the hook member 134. It will be appreciated, however, that other devices such as springs and the like, can also be used to exert a downward force against the rail mounting member 112 so as to maintain contact between the bottom surface 152 of the rail mounting member 112 and the top surface 110 of the sidewall 106.

It will be appreciated that the rail mounting member 112 is configured so that the side 130 of the rail member 112 is substantially the same length as the lip 140 of the sidewall 106 of the truck 100. Further, the hook member 134 of the rail mounting member 112 and the rubber tensioner 144 are configured so that the hook member 134 is securely positioned around the flange 142 of the sidewall 106 with the tensioner 144 compressed between the inner walls of the hook surface 134 and the lip 140 and the flange 142 of the sidewall 106. The combination of the side 130 of the rail member 112 being substantially the same size as the flange 142 of the sidewall 106 and the engagement between the hook surface 134 and the lip 140 and flange 142 results in the rail mounting member 112 being securely fastened to the sidewall 106 of the pickup truck 100. The double sided tape 154 serves to retain the rail mounting member 112 in the desired position on the upper surface 110 of the sidewall 106 of the pickup truck 100 wherein the bottom surface 152 of the rail member 112 is positioned flushly against the upper surface 110 of the sidewall 106 of the pickup truck 100.

FIGS. 1 and 4 also illustrate how the rail member 112 secures cargo in a desired horizontal position within the bed 102 of the pickup truck 100. In particular a rope 180 is tied to a piece of cargo 182 and is then attached to the mounting point 120 in the manner shown in FIG. 4. The forces that are exerted on the rail member 112 when the cargo 182 is secured in the bed has a significant horizontal component as indicated by the arrows 184 in FIG. 4. The rail member 112 transfers this force via the hook surface 134 to the lip 140 and the flange 142 of the sidewall 106 of the pickup truck 100 and some of the force may also be absorbed by the shear resistance of the double-sided tape 154.

Hence, the rail member 112 can secure the piece of cargo 182 in a desired orientation within the bed 102 of the pickup truck 100 against force having a horizontal component less than the amount of force needed to bend the lip 140 or flange 142 of the sidewall 106. It will be understood that the sidewalls 106 of pickup trucks are generally of fairly rigid construction which allows for large pieces of cargo to be secured using the rail member and securing assembly 112 of the preferred embodiment.

It will be further appreciated that if the rail member 112 is configured so that the hook surface 134 of the pickup truck is flushly fit around the lip 140 and flange 142 of the sidewall 106 that only a force having a significant downward component will cause the rail member 112 to dislodge from the upper surface 110 of the sidewall 106 of the pickup truck 100. To prevent this, the double sided tape 154 is attached to the bottom surface 152 of the rail member 112 and the upper surface 110 of the sidewall 106. Further, the securing surface 116 is positioned on the side 130 approximately halfway between the hook surface 134 and the upper surface 126 of the rail member 112 to minimize the moment arm about a pivot point located adjacent the hook surface 134. Preferably, the hook member 134 is also configured so that an inner end 141 of the hook member 134 extends upwards towards the upper surface 110 of the side wall 106 a sufficient amount so as to prevent detachment of the hook member 134 from the flange 142 in response to an upwardly directed force, e.g., a force directed out of the bed 102 of the pickup truck.

It will be appreciated that the construction of the rail mounting member 112 allows for a rail member to be positioned on the pickup truck that has a plurality of mounting points without requiring the installer to drill holes for screws or bolts to secure the rail member to the pickup truck. Hence, the mounting rail member 112 solves the problem of a lack of mounting points for ropes and cords and the like to secure cargo in the bed 102 of the pickup truck 100 without requiring installation steps that would result in permanent damage to the pickup truck 100.

FIG. 5 illustrates how an upper mounting assembly 160 of the preferred embodiment is mounted to the rail mounting member 112. The upper mounting assembly 160 is comprised of the vertical member 114 that is attached to a mounting plate 162 (See also FIG. 1) via a sleeve 165 that is engaged with the ribs 122 and indentations 124 on the upper surface 126 of the rail mounting member 112. In particular, the mounting plate 162 of the upper mounting assembly 160 has a plurality of teeth 164 and indentations 166 that are configured to mesh with the ribs 122 and indentations 124 of the mounting rail member 112. Further, the mounting plate 162 has an inwardly extending member 170 that is configured to rest flushly against the side 130 and the securing surface 116 of the rail mounting member 112. An opening 172 is formed in the inwardly extending member 170 that is configured to receive a fastener 176, such as a bolt, and the opening 172 is preferably formed in the inwardly extending member 170 in a position wherein the fastener 176 will extend through not only the opening 172 in the member 170 but also through one of the mounting points 120 of the mounting rail member 112. A nut 177 can then be positioned on the fastener 176 to securely retain the mounting plate 162 on the upper surface 126 of the rail mounting member 112.

Hence, the upper mounting assembly 160 of the preferred embodiment, provides a mounting plate 162 that engages with the upper surface 126 of the rail mounting member 112 so as to provide a secure base for the vertical member 114. Preferably, a sleeve 165 is mounted on a top surface 167 of the mounting plate 162. The sleeve 165 is configured to receive the vertical member 114 and maintain the member 114 in an upright orientation. Hence, the mounting plate 162 and sleeve 165 can form the base of a roll bar assembly, an overhead rack, a headache bar or any other structure that is likely to be positioned above the bed 102 of the pickup truck by simply positioning and securing the vertical member 114 supporting the vertical structure, e.g., light bar, overhead rack, etc., in the sleeve 165. Additionally, the upper mounting assembly 160 can form the base for a bed divider positioned within the bed. Further, the configuration of the upper surface 126 of the rail mounting member 112 can also be used to receive other types of accessories. In particular, a camper shell having a bottom surface that mates with the upper surface 126 of the rail mounting member 112 can also be installed over the bed of the pickup truck with the rail mounting members of the preferred embodiment.

It will be appreciated that the interconnection between the rail mounting member 112 and the upper mounting assembly 160 does not require that there be mounting post holes or other structures formed in the sidewalls 106 of the pickup truck and thereby allows for easy installation of any of a number of structures that are commonly built above the beds of pickup trucks. The foregoing description has described one of the two rail members 112 and only one of the two upper mounting assemblies 160 illustrated in FIG. 1. It will be understood that in the preferred embodiment, there are rail members 112 that are mounted on either sidewall of the pickup truck and there are generally two or more upper mounting assemblies 160 mounted on the rail members 112. Additional upper mounting assemblies 160 can be positioned at any position along the rail members 112 which thereby allows for great flexibility in positioning overhead racks and the like over the bed 102 of the pickup truck 100.

Although the foregoing description of the preferred embodiment of the preferred invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, but should be defined by the appended claims.

What is claimed is:

1. A securing rail apparatus for securing cargo in the bed of a vehicle wherein said bed has at least one sidewall comprising:

a rail mounting member having a first surface that is configured to be positioned flushly against an upper surface of a sidewall of a cargo bed of a vehicle, so that said first surface of said rail mounting member extends along said upper surface of said side wall of said vehicle, said first surface having a plurality of ribs defining indentations therebetween;

a hook member connected to said rail mounting member wherein said hook member is configured to hook around a lip of said sidewall of said vehicle to securely retain said rail mounting member to said sidewall of said vehicle; and a plurality of mounting points disposed along said rail mounting member so as to be spaced along the length of said rail mounting member, wherein said plurality of mounting points are configured to receive securing devices that secure cargo within said bed of said vehicle, said hook member sized and configured to prevent detachment of said hook member from said sidewall in response to an upward force on the rail mounting member;

a first upper mounting assembly that engages with said plurality of ribs so that said upper mounting assembly supports a vertical member configured to be connected to a light bar or an overhead rack, the first upper mounting assembly comprising:

a mounting plate having a plurality of teeth formed on a bottom surface, wherein said plurality of teeth define indentations and said teeth and indentations of said mounting plate engage with said ribs and indentations on said rail mounting member so as to support said vertical member in a fixed vertical orientation above said bed of said vehicle;

a securing member attached to said mounting plate so as to be positioned adjacent at least one of said plurality of mounting points disposed along said rail mounting member; and a fastener that couples said securing member attached to said mounting plate to said at least one of said plurality of mounting points disposed along said rail mounting member to securely mount said upper mounting assembly to said rail mounting member when said rail mounting member is mounted on said sidewall of said vehicle.

2. The apparatus of claim 1, further comprising an adhering material positioned on a bottom side of said first surface of said rail mounting member so that when the rail mounting member is positioned on the upper surface of the sidewall of the vehicle, the adhering material is interposed between said first surface of said rail mounting member and said upper surface of said side wall of said vehicle, wherein said adhering material, in combination with said hook member, is adapted to secure said apparatus to said sidewall of said vehicle.

3. The apparatus of claim 2, wherein said adhering material is comprised of a piece of double-sided tape which extends the length of said first surface of said rail mounting member.

4. The apparatus of claim 1, further comprising a securing surface which is connected to said rail mounting member so as to extend inward into said bed of said vehicle substantially along the length of said sidewall of said vehicle.

5. The apparatus of claim 4, wherein said plurality of mounting points are comprised of holes formed in said securing surface that are configured to receive ropes for attachment to secure cargo in a selected position within said bed of said vehicle.

6. The apparatus of claim 5, wherein an outer end of said securing surface has a rounded edge to protect said ropes from damage when secured to said mounting points and said cargo.

7. The apparatus of claim 1, wherein said hook member defines a recess that is adapted to receive an end of said lip of said sidewall and wherein said hook member is connected to said rail mounting member so that said recess is spaced from said first surface of said rail mounting member a distance selected so that said lip of said sidewall is positioned in said recess and said first surface of said rail mounting member is positioned adjacent said upper surface of said side wall when said rail mounting member is positioned on said sidewall.

8. The apparatus of claim 7, further comprising a rubber tensioner positioned in said hook member so that said hook member compresses said rubber tensioner against said lip of said sidewall when said hook member is hooked around said lip.

9. The apparatus of claim 1, wherein said plurality of ribs extend substantially along the full length of said rail mounting member.

10. An apparatus for securing cargo in the bed of a truck, comprising:

- a rail mounting member having a first surface that is configured to be positioned flush against an upper surface of a sidewall of said truck and a side surface which is connected, at a first end, to said first surface of said rail mounting member wherein said side surface is configured to be positioned adjacent a lip of said sidewall of said truck extending substantially perpendicularly downward from said upper surface of said sidewall;
- a hook member attached to a second end of said side surface of said rail mounting member wherein said hook member is configured to hook around a bottom end of said lip of said sidewall of said truck;
- a plurality of mounting points attached to said side surface of said rail mounting member so as to be spaced along said length of said rail mounting member, wherein said plurality of mounting points are configured to receive securing devices that are securing cargo in said bed of said truck in a desired position; and
- an adhesive positioned on said first surface of said rail mounting member, wherein said adhesive, in combination with said hook member, is configured to securely retain said rail mounting member to said sidewall of said truck when cargo is secured in said bed of said truck in said desired position by attachment of said securing devices to said mounting points;
- a securing surface attached to and extending outward from said side surface at a point substantially midway between said first and second ends of said side surface so as to reduce a moment arm about said hook member resulting from forces exerted on said rail mounting member due to attachment of securing devices between said points and said cargo secured in said desired position in said bed of said truck, wherein said plurality of mounting points are comprised of holes formed in said securing surface.

11. The apparatus of claim 10, wherein said adhesive is comprised of double sided tape which is attachable to the upper surface of said sidewall and to a bottom surface of said first surface of said rail mounting member to thereby securely attach said first surface of said rail mounting member to said upper surface of said sidewall.

12. The apparatus of claim 10, wherein said first surface of said rail mounting member has a plurality of ribs formed thereon wherein said ribs define indentations therebetween.

13. The apparatus of claim 12, further comprising an upper mounting assembly that engages with said plurality of ribs of said first surface of said rail mounting member so that said upper mounting assembly supports a vertical member.

14. The apparatus of claim 13, wherein said vertical member is configured to be connected to a light bar or an overhead rack.

15. The apparatus of claim 14, wherein said upper mounting assembly is comprised of:

- a mounting plate having a plurality of teeth formed on a bottom surface, wherein said plurality of teeth define indentations and said teeth and indentations of said mounting plate engage with said ribs and indentations on said rail mounting member so as to support said vertical member in a fixed vertical orientation above said bed of said truck;
- a securing member attached to said mounting plate so as to be positioned adjacent at least one of said plurality of mounting points attached to said rail mounting member; and
- a fastener that couples said securing member attached to said mounting plate to said at least one of said plurality of mounting points attached to said rail mounting member to securely mount said upper mounting assembly to said rail mounting member when said rail mounting member is mounted on said sidewall of said truck.

16. The apparatus of claim 15, wherein said plurality of ribs extend substantially along the full length of said rail mounting member.

\* \* \* \* \*